(12) United States Patent
Harden

(10) Patent No.: US 8,388,065 B2
(45) Date of Patent: Mar. 5, 2013

(54) VEHICLE SEAT

(75) Inventor: Matthew J. Harden, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 296 days.

(21) Appl. No.: 12/876,663

(22) Filed: Sep. 7, 2010

(65) Prior Publication Data

US 2012/0056459 A1 Mar. 8, 2012

(51) Int. Cl.
*B60N 2/02* (2006.01)
(52) U.S. Cl. ...... 297/317; 297/316; 297/341; 297/378.1
(58) Field of Classification Search .................. 297/316, 297/317, 319, 340, 341, 378.1, 380
See application file for complete search history.

(56) References Cited

U.S. PATENT DOCUMENTS

| | | | |
|---|---|---|---|
| 5,992,934 A * | 11/1999 | Gehrig et al. ................. | 297/316 |
| 6,152,533 A | 11/2000 | Smuk | |
| 6,601,900 B1 | 8/2003 | Seibold | |
| 6,773,068 B2 | 8/2004 | Shinozaki | |
| 7,156,463 B2 * | 1/2007 | Taubmann et al. ...... | 297/378.12 |
| 7,374,244 B2 | 5/2008 | Becker et al. | |
| 2002/0171282 A1 | 11/2002 | Seibold et al. | |
| 2005/0116522 A1* | 6/2005 | Holdampf .................. | 297/378.1 |
| 2006/0138843 A1* | 6/2006 | Becker et al. .............. | 297/378.1 |
| 2006/0181129 A1 | 8/2006 | Bronner et al. | |
| 2008/0073960 A1* | 3/2008 | Nakaya et al. ................ | 297/341 |
| 2009/0088930 A1* | 4/2009 | Ohtsubo et al. ................. | 701/49 |
| 2009/0160234 A1 | 6/2009 | Becker et al. | |
| 2009/0167068 A1* | 7/2009 | Yamagishi .................... | 297/340 |

* cited by examiner

*Primary Examiner* — David Dunn
*Assistant Examiner* — Philip Gabler
(74) *Attorney, Agent, or Firm* — Rankin Hill & Clark LLP

(57) ABSTRACT

A vehicle seat movable between a seating mode, an ingress/egress mode, and a cargo mode includes a vehicle seat rotation controlling apparatus. The vehicle seat rotation controlling apparatus allows a seat back to be rotated toward a seat bottom into the ingress/egress mode while holding the seat bottom in an elevated position. Further, the vehicle seat rotation controlling apparatus allows the seat back to be rotated further toward the seat bottom into the cargo mode while rotating the seat bottom into a lowered position. When the vehicle seat is moved from the cargo mode to the seating mode, the seat back is rotated away from the seat bottom while the vehicle seat rotation controlling apparatus causes the seat bottom to rotate into the elevated position.

15 Claims, 3 Drawing Sheets

VEHICLE SEAT

BACKGROUND

The present disclosure relates to a vehicle seat, and more particularly to a vehicle seat movable between a seating mode, an ingress/egress mode, and a cargo mode. In certain large vehicles, such as Sport-Utility Vehicles (SUVs) and minivans, adjustable vehicle seats that are movable between a seating mode, an ingress/egress mode, and a cargo mode are used to allow for a passenger/cargo area that can be selectively adjusted to increase storage or seating space, while allowing access to areas disposed behind the seats without having to move the seats from the seating mode into the cargo mode. However, the configuration of such vehicle seats can result in limiting or restricting the distance that the seats can slide forward while in the ingress/egress mode. As such, passage into the area disposed behind the seats can be more difficult and/or less comfortable.

SUMMARY

According to one aspect, a vehicle seat rotation controlling apparatus for controlling rotation of a vehicle seat bottom relative to a vehicle includes a seat bottom height controlling mechanism that is operably connected to a seat back so as to hold the seat bottom in an elevated position while the seat back is in a rotational position corresponding to a seating mode or an ingress/egress mode and to rotate the seat bottom to a lowered position in response to the seat back being rotated to a rotational position corresponding to a cargo mode.

According to another aspect, a vehicle seat has a seat back and a seat bottom rotatably movable between a seating mode, an ingress/egress mode, and a cargo mode. Rotation of the seat back and the seat bottom is controlled by a vehicle seat rotation controlling apparatus, which includes a seat bottom height controlling mechanism operably connected to the seat back so as to hold the seat bottom in an elevated position while the seat back is in a rotational position corresponding to the seating mode and the ingress/egress mode and to rotate the seat bottom to a lowered position in response to the seat back being rotated to a rotational position corresponding to the cargo mode.

According to still another aspect, a method of changing a mode of a vehicle seat between a seating mode, an ingress egress mode, and a cargo mode is provided. In the method according to this aspect, a seat back is rotated from the seating mode toward a seat bottom within a first predetermined range of rotation while holding the seat bottom in an elevated position to place the vehicle seat in the ingress/egress mode. The seat back is further rotated from the ingress/egress mode toward the seat bottom past the first predetermined range of rotation while rotating the seat bottom into a lowered position to place the vehicle seat in a cargo mode. The seat back can then be rotated from the cargo mode away from the seat bottom while rotating the seat bottom into the elevated position to place the vehicle seat in the seating mode.

DETAILED DESCRIPTION

An adjustable vehicle seat and a vehicle seat rotation controlling apparatus will be described herein with reference to the appended figures. In this regard, the description made with reference to the figures is made to exemplify the adjustable vehicle seat and vehicle seat rotation controlling apparatus disclosed herein. As such, the description with reference to the figures is not intended to limit the scope of the disclosure.

Figure 1:
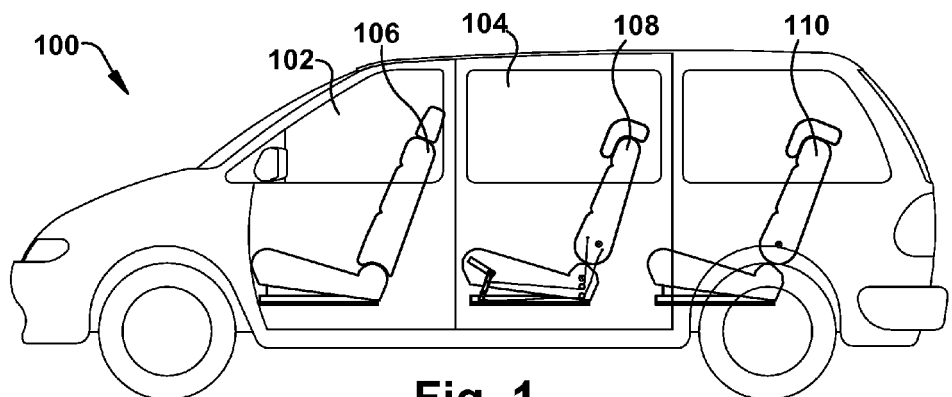
FIG. 1 is side schematic view of a four-door SUV having three rows of seating with an adjustable vehicle seat.

FIG. 1 illustrates a vehicle 100, such as a minivan or SUV, associated with the described adjustable vehicle seat. As illustrated, the vehicle 100 has four doors, including a front door 102 and a rear door 104 provided on each side of the vehicle 100. The vehicle 100 is also illustrated as having three rows of seats including first row seats 106 transversely adjacent to the front doors 102, second row seats 108 transversely adjacent to the rear doors 104, and third row seats 110 disposed longitudinally behind the second row seats 108. As used herein, a passenger/cargo area is defined as including a portion of the vehicle 100 where at least the second and third row seats 108, 110 are provided. However, it is noted that the passenger/cargo area can also include a passenger side front seat 106. While in the illustrated embodiment, the vehicle 100 is shown as a minivan or SUV, it is to be appreciated that other types of vehicles could be used in which multiple rows of seating are provided.

To facilitate adjustment of the seating capacity or cargo space of the passenger/cargo area, the second and third row seats 108, 110 are adjustable seats that allow a user to selectively provide any of the seats in a seating mode or a cargo mode. In FIG. 1, the second and third row seats 108, 110 are illustrated in the seating mode, with the seat backs upright. If additional cargo space is desired, any or all of the seats in the passenger/cargo area can be adjusted or folded into a cargo mode, where the seat back is folded onto a seat bottom and the seat bottom is lowered. When all of the seats in the passenger/cargo area are in the cargo mode, the passenger/cargo area may appear to have no seats provided therein and/or a zero angle surface may be presented as a cargo floor. While in the illustrated embodiment the second and third row seats 108, 110 are described as being adjustable seats, it is contemplated that only one row of seats may be the adjustable seats and/or that the third row seats 110 could be eliminated with only cargo space provided behind the second row seats 108.

In the illustrated vehicle 100, the third row seats 110 are not directly associated with the front or rear doors 102, 104. Particularly, the vehicle 100 is not provided with a door that is transversely adjacent to the third row seats 110. Accordingly, entry to the third row seats 110, or the area where the third row seats 110 are provided, requires a passenger to open a rear door 104 and fit behind one of the second row seats 108. To facilitate such passage, the second row seats 108 are also movable into an ingress/egress mode, where the seat back is partially folded downward relative to the seat bottom and the seat is slidable in a forward/rearward direction. As will be apparent with reference to the below description, the second row seat 108 (hereinafter, "seat 108") is rotatably movable between the seating mode, the ingress/egress mode, and the cargo mode in a manner that improves the comfort and ease with which a passenger can enter or leave the third row seating area.

Figure 2:
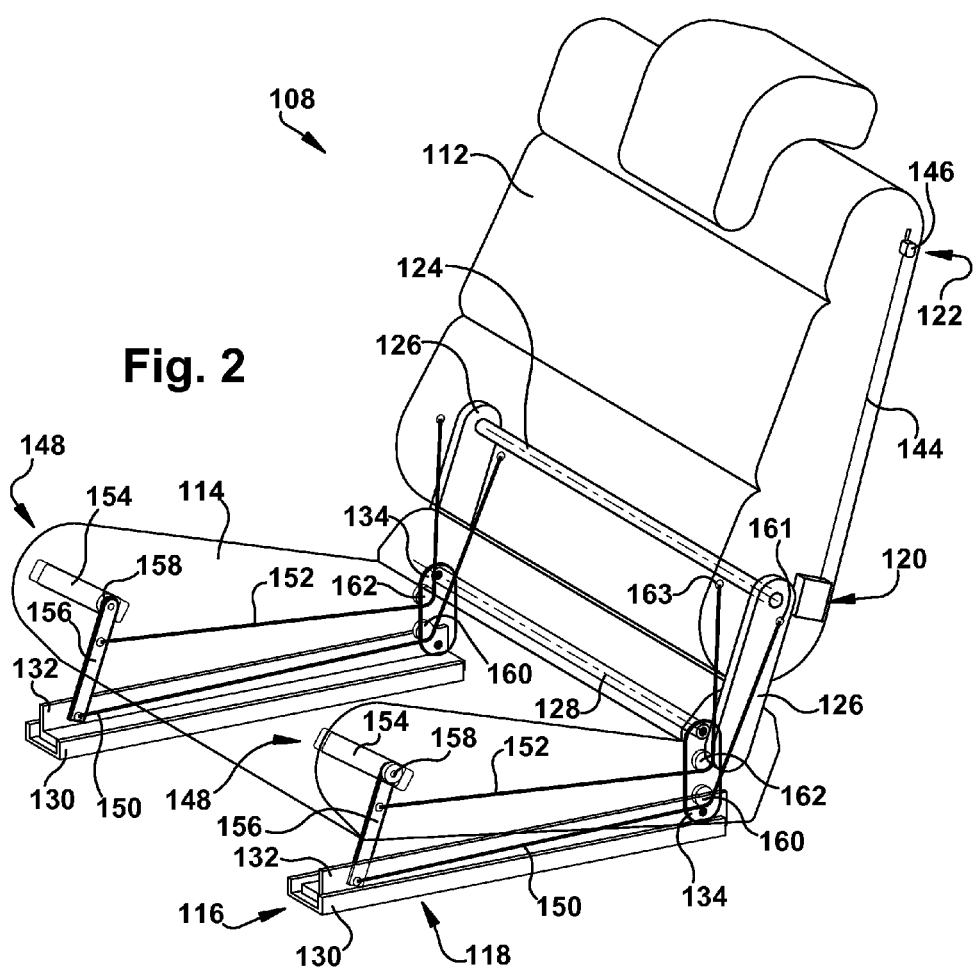
FIG. 2 is a transparent perspective view of the vehicle seat.

As shown in FIG. 2, the seat 108 includes a seat back 112 rotatably mounted to a seat bottom 114, with the seat bottom 114 being rotatably and slidably mounted to a vehicle seat mounting assembly 116 (hereinafter, "mounting assembly 116") attached to a vehicle floor. The seat 108 is also provided with a vehicle seat rotation controlling apparatus 118 (hereinafter, "VSRCA 118") for controlling the rotational movement of the seat between the seating mode, the ingress/egress mode, and the cargo mode, and a locking mechanism 120 and a lock releasing mechanism 122 for selectively locking the seat 108 in the seating mode.

The seat bottom 114 and seat back 112 are typically cushion members that form the portion of the seat on which a passenger is to sit. However, the seat bottom 114 and seat back 112 will be described herein as skeletal members forming the seat 108. In this regard, the seat bottom 114 is a roughly rectangular shaped member that is provided adjacent to a vehicle floor so as to support a posterior portion of a passenger. The seat back 112 is a roughly rectangular shaped member that extends upward from a rear portion of the seat bottom 114 so as to support a back and head of the passenger.

To allow rotatable or pivoting movement of the seat back 112 and the seat bottom 114, the seat back 112 is supported by a first pivot rod 124 at a substantially lower portion thereof and the seat bottom 114 is supported by a second pivot rod 128 at a rear portion thereof. The first pivot rod 124 is supported on either end by legs 126 that connect the first pivot rod 124, and thereby the seat back 112, to the seat bottom 114. The second pivot rod 128 is supported on either end by legs 134 that connect the second pivot rod 128, and thereby the seat bottom 114, to the mounting assembly 116.

Figure 3A:
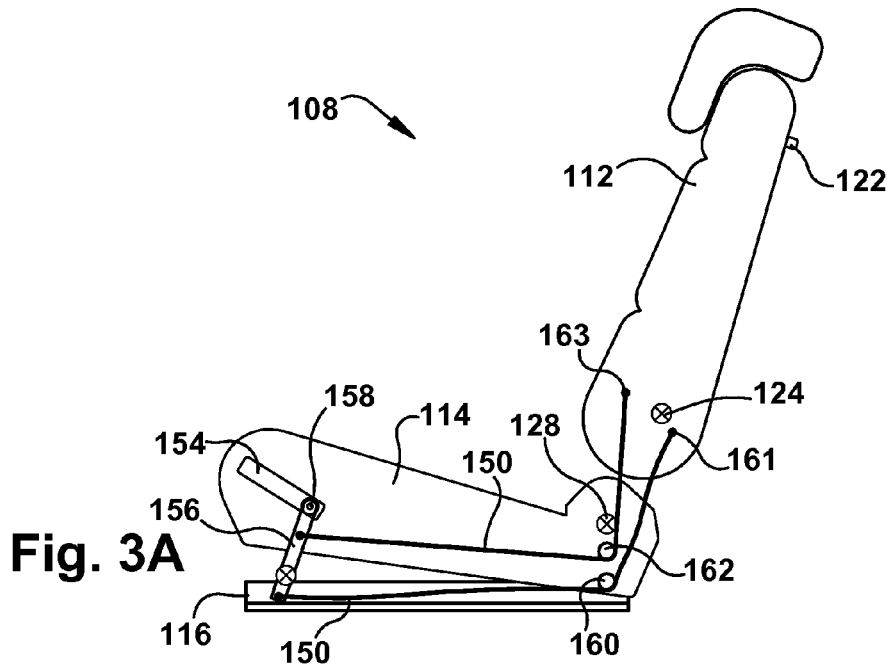
FIG. 3A is a side schematic view of the adjustable vehicle seat in a seating mode.
Figure 3B:
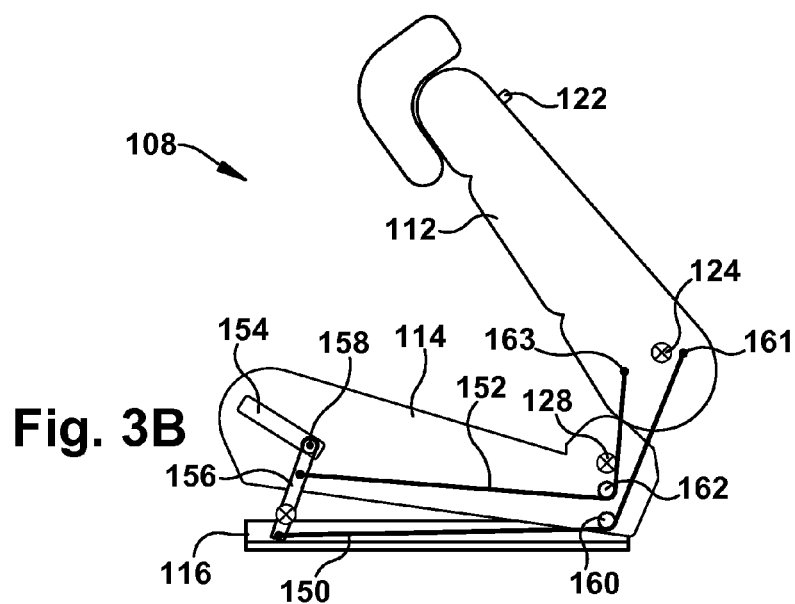
FIG. 3B is a side schematic view of the adjustable vehicle seat in an ingress/egress mode.
Figure 3C:
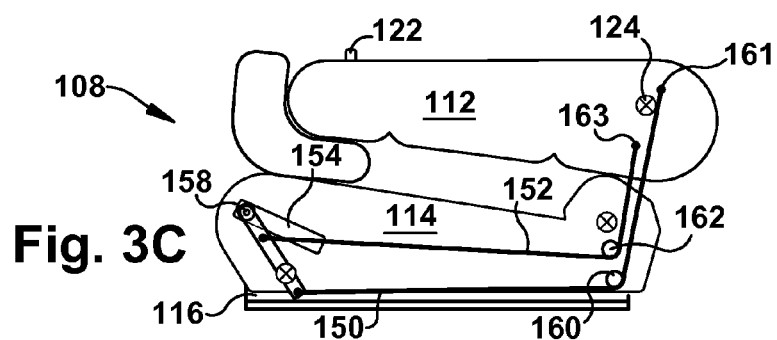
FIG. 3C is a side schematic view of the adjustable vehicle seat in a cargo mode.

The seat back 112 is supported by the first pivot rod 124 so as to integrally rotate with the first pivot rod 124 such that a front face of the seat back 112 is movable either toward or away from a top face of the seat bottom 114 (see FIGS. 3A-3C). The seat bottom 114 is supported by the second pivot rod 128 so as to integrally rotate with the second pivot rod 128 such that a front end of the seat bottom 114 is movable in an upward and downward direction relative to the vehicle floor (see FIGS. 3B and 3C). Through these rotational movements, the seat 108 can change between the seating mode (FIG. 3A), the ingress/egress mode (FIG. 3B), and the cargo mode (FIG. 3C). As will be described in further detail below, the change to the cargo mode with respect to the rotation of the seat bottom 114 is caused by a degree of rotation of the seat back 112 relative to the seat bottom 114.

It is noted that the first and second pivot rods 124, 128 also define axes of rotation of the respective seat back 112 and seat bottom 114. As such, the rotation of the seat back 112 and seat bottom 114 hereinbelow may be referenced as rotation "about" the first and second pivot rods 124, 128. Such description is intended to reference the axes defined by the pivot rods 124, 128, and is not necessarily intended to imply that the pivot rods 124, 128 are stationary.

Along an undersurface, the seat bottom 114 is connected to and supported by the mounting assembly 116. The mounting assembly 116 of the illustrated embodiment includes a pair of U-shaped base rails 130 attached to the vehicle floor and a pair of L-shaped slide rails 132 attached to the seat bottom 114. The base rails 130 are attached to the vehicle floor so as to extend in a longitudinal (forward-rearward) direction of the vehicle 100, while the slide rails 132 are attached to the seat bottom 114 so as to extend in a similar longitudinal direction, and are provided such that one of the surfaces of each of the L-shaped slide rails 132 is generally flush against a bottom surface of a corresponding U-shaped base rail 130. The slide rails 132 engage the base rails 130 so as to be slidably movable in a forward/rearward direction along the base rails 130. The mounting assembly 116 described herein is an exemplary mounting assembly. As such, the mounting assembly can take different forms known in the art.

A surface of the L-shaped slide rail 132 that extends from the surface that is flush against the bottom surface of the U-shaped base rail 130 projects upward so as to engage the seat bottom 114. Particularly, a front end of the seat bottom 114 is connected to each of the slide rails 132 through the VSRCA 118, as will be described below. A rear end of the seat bottom 114 is attached to each of the slide rails 132 through the legs 134 and the second pivot rod 128 that supports the seat bottom 114. Accordingly, the seat bottom 114 is slidable in a forward/rearward direction relative to the vehicle floor through the connection to the slide rails 132 and the base rails 130.

The locking mechanism 120 and the lock releasing mechanism 122 are provided so as to selectively hold the seat 108 in the seating mode when desired. Specifically, the locking mechanism 120 is provided to prevent rotation of the seat back 112 about the first pivot rod 124 and to prevent sliding movement of the seat bottom 114 along the mounting assembly 116. The lock releasing mechanism 122 is provided to release the locking mechanism 120 and thereby allow rotation of the seat back 112 and sliding movement of the seat bottom 114.

Alternative or additional locking/unlocking mechanisms can be provided that would selectively prevent/allow adjustment of the seat 108 for passenger comfort purposes. Particularly, alternative or additional mechanisms could allow the seat bottom 114 to slide in the forward/rearward direction and/or the seat back 112 to rotate about the first pivot rod 124 while the seat 108 remains in the seating mode. Further still, the locking mechanism 120 can be operable to lock the seat 108 in the cargo mode, as well as the seating mode. The types of locking and lock releasing mechanisms 120, 122 that can be used with the seat 108 encompass any conventionally known mechanisms. As such, for simplification of the instant disclosure, the specific mechanisms will not be described with reference to any particular embodiment.

When the seat 108 is changing between the seating mode, the ingress/egress mode, and the cargo mode, the VSRCA 118 controls the seat rotation. The VSRCA 118 can be provided on one or both transverse sides of the seat 108. As shown in FIG. 2, the VSRCA 118 is provided on both transverse sides of the seat 108. However, it is noted that the assembly on either side of the seat 108 is generally identical to the other. Therefore, only a single VSRCA 118 will be described with reference to one (left) side of the seat 108.

The VSRCA 118 includes a seat bottom height controlling mechanism 148 (hereinafter, "height controlling mechanism 148") connecting a front end of the seat bottom 114 to the slide rail 132, a lowering cable 150 and an elevating cable 152 connected to the seat bottom height controlling mechanism 148, a lowering pulley or roller 160, an elevating pulley or roller 162, a lowering attachment point 161, and an elevating attachment point 164. The height controlling mechanism 148 further includes an elongated bracket 154 attached to the seat bottom 114 and a rod 156 connecting the mounting assembly slide rail 132 to the elongated bracket 154. The rod 156 is pivotally or rotatably attached to the slide rail 132 and connects with or engages the elongated bracket 154 through a roller 158 fixed on an upper end of the rod 156.

The elongated bracket 154 is attached to the seat bottom 114 so as to extend in a longitudinal direction of the vehicle 100. The elongated bracket 154 has a projecting portion that projects transversely from the seat bottom 114 such that a longitudinally extending portion of the elongated bracket 154 defines a passage between the elongated bracket 154 and the seat bottom 114. The passage is sized to firmly receive and engage the roller 158 fixed on the upper end of the rod 156. Therein, the roller 158 is movable between a rear or first end and a front or second end of the elongated bracket 154.

The rod 156 is an elongated plate member that has the roller 158 attached to an upper end thereof and is pivotally or rotatably attached to the mounting assembly slide rail 132. The rotatable attachment point of the rod 156 to the slide rail 132 is at a longitudinal position nearer to the first end of the bracket 154 than to the second end of the bracket 154. As such, when the upper end of the rod 156, where the roller 158 is fixed, is at the first end of the bracket 154, the distance between the rod 156 attachment point and the bracket 154 is greater in a vertical direction than when the roller 158 is at the second end of the bracket 154. As such, when the roller 158 is at the first end of the bracket 154, the seat bottom 114 is held at a relatively elevated position. Conversely, when the roller 158 is at the second end of the bracket 154, the seat bottom 114 is held at a relatively lowered position.

The lowering cable 150 is attached to the rod 156 at a lower portion thereof and the elevating cable 152 is attached to the rod 156 at an upper portion thereof. As described herein, the upper portion of the rod 156 is the portion between the roller 158 and the point on the rod 156 at which the rod 156 is rotatably attached to the mounting assembly slide rail 132. The lower portion of the rod 156 is the portion below the rotatable attachment to the mounting assembly slide rail 132 disposed away from the roller 158. As illustrated, the lowering cable 150 can pull the rod 156 so as to cause a counter-clockwise rotation around the rotatable attachment to the slide rail 132, while the elevating cable 152 can pull the rod 156 to cause a clockwise rotation around the rotatable attachment to the slide rail 132.

The lowering cable 150 extends from the lower portion of the rod 156 to a lowering attachment point 161 disposed in the seat back 112 through a lowering cable roller 160 provided at a rear portion of the seat bottom 114. The elevating cable 152 extends from the upper portion of the rod 156 to an elevating attachment point 163 disposed in the seat back 112 through the elevating cable roller 162 provided at the rear portion of the seat bottom 114. Each of the rollers 160, 162 are rotatably mounted in a stationary position at the rear portion of the seat bottom 114 such that associated cable 150, 152 is routed between the attachment point on the rod 156 and the attachment point 161, 163 in the seat back 112. To facilitate the provision of the cables 160, 162, the elevating cable roller 162 can be provided at a position relatively above the lowering cable roller 160.

With respect to the attachment points 161, 163 in the seat back 112, the lowering attachment point 161 is provided in the seat back 112 at a position that is disposed relatively rearward of the first pivot rod 124. The elevating attachment point 163 is provided in the seat back 112 as a position that is disposed relatively forward of the first pivot rod 124. As described herein, a lowering cable path is a path between the lowering attachment point 161, the lowering cable roller 160, and the point of attachment of the lowering cable 150 to the lower portion of the rod 156. An elevating cable path is a path between the elevating attachment point 163, the elevating cable roller 162, and the attachment point of the elevating cable 152 to the upper portion of the rod 156.

As will be appreciated, the length of the cable paths change as the seat back 112 is rotated relative to the seat bottom 114, while the length of the cables 150, 152 stretching along the paths remain the same. Further, the attachment points 161, 163 in the seat back are fixed. As such, the cables 150, 152 are made taut or slack so as to apply a variable pulling force on the rod 156 as the path of the cables 150, 152 is increased or decreased through rotation of the seat back 112 relative to the seat bottom 114.

Specifically, the cables 150, 152 are provided with a length and the attachment points 161, 163 in the seat back are disposed such that the lowering cable path and the elevating cable path are inversely increased and decreased based on the rotation amount of the seat back 112 relative to the seat bottom 114. Particularly, the cables 150, 152 and attachment points 161, 163 are set so that the lowering cable path increases and the elevating cable path decreases as the seat back 112 is rotated toward the seat bottom 114. Conversely, the elevating cable path increases and the lowering cable path decreases as the seat back 112 is rotated away from the seat bottom 114.

Because the lowering cable 150 and the elevating cable 152 are fixed in length, as the length of each cable path changes, a tensile force within the cable proportionally changes, with the change in tensile force between the two cables being inversely related. Through this interaction of tensile forces acting on the lowering and elevating cables 150, 152, the rod 156 rotates about the rotatable attachment point on the slide rail 132 such that the portion of the rod 156 that is attached to the lowering or elevating cable 150, 152 that is more taut is pulled toward a rear of the vehicle.

In other words, as the seat back 112 is rotated away from the seat bottom 114, the pulling force exerted by the elevating cable 152 on the upper portion of the rod 156 increases while the pulling force exerted by the lowering cable 150 on the lower portion of the rod 156 decreases. Conversely, as the seat back 112 is rotated toward the seat bottom 114, the pulling force exerted by the lowering cable 150 on the lower portion of the rod 156 increases as the pulling force exerted by the elevating cable 152 on the upper portion of the rod 156 decreases. In this regard, the rod 156 and the cables 150, 152 are provided such that the roller 158 is at the first end of the bracket 154 until the seat back 112 is rotated to a position corresponding to the cargo mode, at which point the lowering cable 150 exerts a force sufficient to rotate the rod 156 about the rotatable attachment point to the slide rail 132, thereby moving the roller 158 to the second end of the bracket 154.

As such, the roller 158 is pulled toward the first end of the bracket 154 when the elevating cable 152 is taut as a result of the seat back 112 being upright (in the seating mode) or slightly moved or rotated toward the seat bottom 114 (in the ingress/egress mode). When the roller 158 at the first end of the bracket 154, the seat bottom 114 is held in an elevated position and prevented from rotating about the second pivot rod 128. Conversely, the roller 158 is moved toward the second end of the bracket 154 when the lowering cable 150 is taut as a result of the seat back 112 being moved into a rotational position corresponding to the cargo mode. When the roller 158 is moved to the second end of the bracket 154, the seat bottom 114 is rotated about the second pivot rod 128, causing a front end of the seat bottom 114 to move and be held in the lowered position.

Through this motion of the rod 156, the VSRCA 118 controls rotation of the seat bottom 114 in response to the rotation of the seat back 112. Particularly, the seat bottom 114 is only allowed to rotate about the second pivot rod 128 when the seat back 112 is rotated to a certain degree, which corresponds to the cargo mode. In this regard, the cable paths and cable lengths are set to ensure that the force exerted on the upper portion of the rod 156 by the elevating cable 152 when the seat back 112 is in a rotational position corresponding to the seating mode or ingress/egress mode is sufficient to override any force applied to the lower portion of the rod 156 by the lowering cable 150, thereby holding the roller 158 at the first end of the bracket 154. Only when the seat back 112 is rotated toward the seat bottom beyond a degree corresponding to the ingress/egress mode does the lowering cable 150 exert a force sufficient to overcome the elevating cable 152 pulling force, thereby causing the rod 156 to rotate and move the roller 158 to the second end of the bracket 154. It is noted that the decrease in the exerted pulling force on the rod 156 by the cables 150, 152 when the seat back 112 is rotated in a particular direction facilitates the relative provision of force exerted on the rod 156.

As the seat back 112 rotates between rotational positions corresponding to the seating mode, the ingress/egress mode, and the cargo mode, there is a lowering change-over point and an elevating change-over point, whereat the force exerted on the rod 156 by the lowering and elevating cables 150, 152 causes the rod to rotate about the pivotal attachment to the slide rail 132 such that the upper end of the rod 156, to which the roller 158 is attached, is caused to move from one of the first or second end of the bracket 154 to the other. The particular rotational position of the seat back 112 at which the changeover occurs is preferably set so as to be a position of rotation of the seat back 112 that is closer to the seat bottom 114 than would occur when folding the seat 108 into the ingress/egress mode. Moreover, it is noted that a separate locking and releasing mechanism can be provided at this point, to ensure that a user does not mistakenly fold the seat 108 into the cargo mode.

With reference to FIGS. 3A-3C, the changing of the seat 108 between the seating, ingress/egress, and cargo modes will be explained. In FIG. 3A, the seat back 112 is in a rotational position corresponding to the seating mode, wherein the seat back 112 is substantially upright (at approximately a right angle) with respect to the seat bottom 114. The rotational position of the seat back 112 relative to the seat bottom 114 while in the seating mode encompasses all rotational positions of the seat back 112 wherein a passenger can comfortably sit in the seat 108, or at a minimum is a rotational position that is mutually exclusive from the rotational position corresponding to the ingress/egress mode.

In the seating mode, it is noted that the elevating cable path is at a relative maximum and the lowering cable path is at a relative minimum. Thus, the elevating cable 152 is experiencing a maximum tensile force and is exerting a maximum force in a rearward direction on the upper portion of the rod 156, while the lowering cable 150 is experiencing a minimum tensile force and is exerting a minimal force in a rearward direction on the lower portion of the rod 156.

In FIG. 3B, the seat back 112 is in a rotational position relative to the seat bottom 114 corresponding to the ingress/egress mode. As shown, the seat back 112 is at roughly a 45-degree angle relative to the seat bottom 114, though other angles could be used for the ingress/egress mode. The rotational position of the seat back 112 corresponding to the ingress/egress mode extends, and is preferably mutually exclusive, from the rotational position of passenger comfort (the seating mode) to the rotational position corresponding to the cargo mode. In this regard, the lengths of the elevating and lowering cable paths are both at a mid-range when the seat back 112 is in a rotational position corresponding to the ingress/egress mode.

To ensure that the seat bottom 114 does not rotate about the second pivot rod 128 while in the ingress/egress mode, the rearward force applied to the upper portion of the rod 156 by the elevating cable 152 should be greater than that applied to the lower portion of the rod 156 by the lowering cable 150. To achieve this, the length of the elevating cable 152 relative to the elevating cable path should be smaller than that of the lowering cable 150 relative to the lowering cable path when the seat back 112 is in a rotational position corresponding to the ingress/egress mode. Accordingly, the roller 158 is held at the first end of the bracket 154 and the seat bottom 114 is not allowed to rotate about the second pivot rod 128.

In FIG. 3C, the seat 108 is in a cargo mode with the seat bottom 114 in a lowered position and the seat back 112 in a rotational position corresponding to that of the cargo mode. In this regard, the rotational position of the seat back 112 corresponding to the cargo mode is generally one of maximum rotation such that a front face of the seat back 112 is contacting an upper face of the seat bottom 114 and/or a rear surface of the seat back 112 provides a zero degree cargo surface or floor (i.e., zero degree angular orientation relative to a horizontal plane). Moreover, it is noted that when the seat back 112 is in the rotational position corresponding to the cargo mode, the length of the lowering cable path is at a maximum and the length of the elevating cable path is at a minimum. Consequently, the lowering cable 150 exerts a maximum force on the lower portion of the rod 156 while the elevating cable 152 exerts a minimum force on the upper portion of the rod 156.

The respective forces cause the rod 156 to rotate about the pivotal attachment to the slide rail 132 such that the lower portion of the rod 156 moves in a rearward direction and the roller 158 moves in a forward direction to the second end of the elongated bracket 154. As the distance between the rotatable attachment point of the rod 156 to the slide rail 132 is further from the second end of the bracket 154 in the longitudinal direction than the first end of the bracket 154, the rod 156 and roller 158 exert a downward pulling force on the bracket 154. This downward pulling force causes the seat bottom 114 to rotate about the second pivot rod 128 and results in the front end of the seat bottom 114 moving in a downward direction relative to the vehicle floor. As such, the seat 108 is better stowed for the cargo mode.

In view of the above, it is noted that when the seat back 112 is rotated relative to the seat bottom 114 within rotational positions corresponding to the seating mode and the ingress/egress mode, the seat bottom 114 does not rotate about pivot rod 128. However, when the seat back 112 is rotated toward the seat bottom 114 from the seating and/or ingress/egress modes to the cargo mode, the lowering cable 150 acts on the rod 156 to cause the seat bottom 114 to rotate about the pivot rod 128, such that the front portion of the seat bottom 114 is lowered. Conversely, when the seat back 112 is rotated from the cargo mode to the ingress/egress and seating modes, the elevating cable 152 acts on the rod 156 (and the force exerted by the lowering cable 150 is sufficiently reduced) to cause the seat bottom 114 to rotate about the pivot rod 128 such that the front portion of the seat bottom 114 is elevated. As such, the rotation of the seat back 112 relative to the seat bottom 114 actuates rotation and/or movement of the seat bottom 114.

Figure 4A:
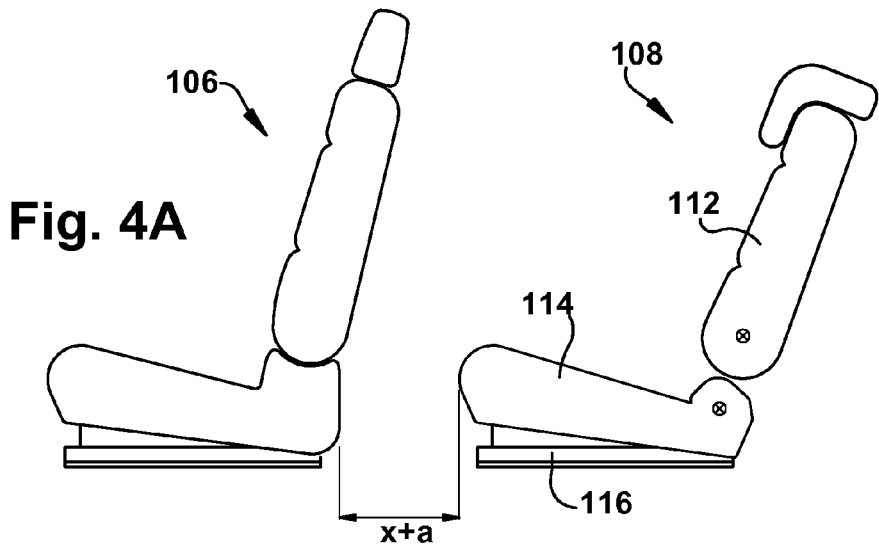
FIG. 4A is a side schematic view of first and second row vehicle seats, with the second-row vehicle seat in the seating mode.

When the seat 108 is included, it can be provided with the same adjustable features as discussed in reference to the seat 106. When so configured, the sliding operation of the seat 108 when in the ingress/egress mode is demonstrated with reference to FIGS. 4A-4C. Particularly, FIG. 4A illustrates the second row seat 108 situated behind the front seat 106, with both seats in the seating mode. From this position, the second row seat 108 is moved into the ingress/egress mode, with the seat back 112 partially rotated toward the seat bottom 114 and the seat bottom 114 slidable along the mounting assembly 116.

Figure 4B:
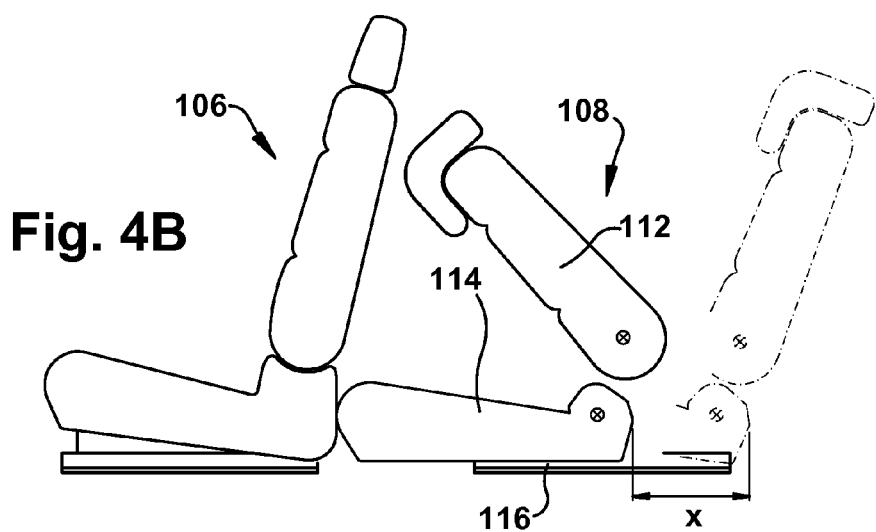
FIG. 4B is a side schematic view of first and second row vehicle seats, with the second-row vehicle seat in an ingress/egress mode with the seat bottom rotated downward and maximally moved in a forward direction with respect to the first-row seat.

In FIG. 4B, the seat bottom 114 is rotated downward when the seat back 112 is in the rotational position corresponding to the ingress/egress mode. When the front end of the seat bottom 114 rotates downward, the front end of the seat bottom 114 also moves forward a distance "a", though a back end of the seat bottom 114 does not move. Accordingly, the seat 108 can only be slid forward a distance "x".

Figure 4C:
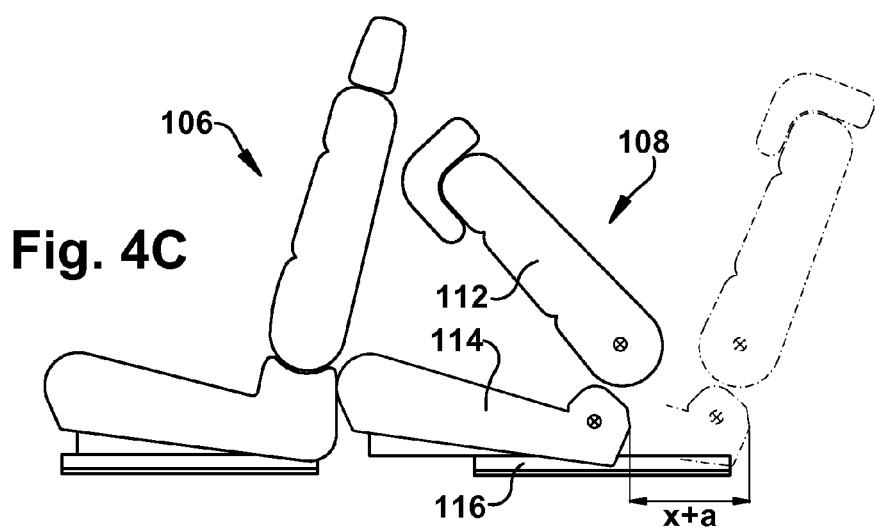
FIG. 4C is a side schematic view of first and second row vehicle seats, with the second-row vehicle seat in an ingress/egress mode with the seat bottom unrotated and maximally moved in a forward direction with respect to the first-row seat.

In FIG. 4C, the seat 108 is illustrated in the ingress/egress mode with the seat bottom 114 held in the elevated position, e.g., the seat bottom 114 is prevented from rotating about the second pivot rod 128. Therein, since the seat bottom 114 front end does not rotate downward, the seat bottom 114 front end also does not move in the forward direction. As such, the seat 108 is slidable in the forward direction the distance "x" plus the distance "a", where the distance "a" corresponds to the forward movement of the front end of the seat bottom 114 when the seat bottom rotates downward and forward, as shown in FIG. 4B. Accordingly, the seat 108 of FIG. 4C is slidable in a forward direction a total distance of "x" +"a", providing additional room for ingress/egress of the passenger to the area where the third row seats 110 are located.

It is noted that the above-described vehicle seat and vehicle seat rotation controlling apparatus is amenable to various modifications and changes while remaining within the scope and spirit of the instant disclosure. As an example of modifications that are considered within the scope of the disclosure, the vehicle can be a two-door vehicle or the adjustable/movable seat can be a seat other than a second row seat, such as a front passenger seat or a third row seat. Further, insofar as basic features of the seat construction and locking mechanism have been described, such a description is generally made so as to apprise a person of ordinary skill in the art of the construction of the vehicle seat without over-burdening the instant disclosure. It will be appreciated that the apparatus of the instant disclosure is amenable to modifications to the vehicle seat and locking mechanism.

Moreover, a single VSRCA 118 can be provided, rather than the pair of VSRCAs 118. The operation of the height controlling mechanism 148 can be altered so that the elevating cable 152 pulls the rod 156 such that the roller 158 moves in a forward direction, corresponding to the elevated position of the seat bottom 114, whereas the lowering cable 150 pulls the rod 156 such that roller moves in a rearward direction, corresponding to the lowered position of the seat bottom 114. With respect to the cables 150, 152, the VSRCA 118 is amenable for use with Bowden cables.

The second row seats can also be provided so as to be removable from the vehicle. Additionally, one of the second row seats may be provided without the VSRCA 118 described above. Particularly, in a minivan having a single sliding door, it is generally not necessary for both second row seats to be movable into the ingress/egress mode.

It will further be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle seat rotation controlling apparatus for controlling a rotation of a vehicle seat bottom relative to a vehicle, the apparatus comprising:
   a seat bottom height controlling mechanism operably connected to a seat back so as to hold the seat bottom in an elevated position while the seat back is in a rotational position corresponding to a seating mode and an ingress/egress mode and to rotate the seat bottom to a lowered position in response to the seat back being rotated to a rotational position corresponding to a cargo mode, wherein the vehicle seat rotation controlling apparatus comprises:
   an elongated bracket attached to the seat bottom and having a first end and a second end;
   a rod pivotally attached to a vehicle seat mounting assembly disposed below the vehicle seat, the rod pivotally attached to the vehicle seat mounting assembly in a longitudinal position that is closer to the elongated bracket first end than the elongated bracket second end;
   a roller attached to a top end of the rod and slidably received in the elongated bracket;
   a lowering cable connected at a first end to the rod and at a second end to the seat back; and
   an elevating cable connected at a first end to the rod and at a second end to the seat back,
   wherein the lowering cable is provided so as to exert a pulling force on the rod causing the rod to pivot such that the roller is moved to the elongated bracket second end, thereby lowering the seat bottom, when the seat back is moved from the rotational position corresponding to the seating mode and ingress/egress mode to the rotational position corresponding to the cargo mode, and
   wherein the elevating cable is provided so as to exert a pulling force on the rod causing the rod to pivot such that the roller is moved to the elongated bracket first end, thereby raising the seat bottom, when the seat back is moved from the rotational position corresponding to the cargo mode to the rotational position corresponding to the seating mode and ingress/egress mode.

2. The vehicle seat rotation controlling apparatus according to claim 1, wherein the first end of the lowering cable is connected to a lower portion of the rod disposed below the pivotal attachment of the rod to the seat mounting assembly and the first end of the raising cable is attached to an upper portion of the rod disposed between the roller and the pivotal attachment of the rod to the seat mounting assembly.

3. The vehicle seat rotation controlling apparatus according to claim 2, wherein the first end of the elongated bracket is disposed relatively rearward of the second end of the elongated bracket.

4. The vehicle seat rotation controlling apparatus according to claim 1, wherein the lowering cable and the elevating cable are Bowden cables.

5. The vehicle seat rotation controlling apparatus according to claim 1, wherein the vehicle seat rotation controlling apparatus further comprises:
   a stationary lowering cable pulley engaging the lowering cable at a position between the first and second end thereof; and a stationary elevating cable pulley engaging the elevating cable at a position between the first and second ends thereof.

6. A vehicle seat having a seat back and a seat bottom rotatably movable between a seating mode, an ingress/egress mode, and a cargo mode, rotation of the seat back and seat bottom being controlled by a vehicle seat rotation controlling apparatus, comprising:
a vehicle seat mounting assembly interconnecting a vehicle floor and the seat bottom such that the vehicle seat is slidably movable in a longitudinal direction; and
a seat bottom height controlling mechanism operably connected to the seat back so as to hold the seat bottom in an elevated position while the seat back is in a rotational position corresponding to the seating mode and the ingress/egress mode and to rotate the seat bottom to a lowered position in response to the seat back being rotated to a rotational position corresponding to the cargo mode, wherein the vehicle seat rotation controlling apparatus comprises:
an elongated bracket, having a first end and a second end, attached to the seat bottom;
a rod pivotally attached to a portion of the vehicle seat mounting assembly that slidably moves with the seat bottom, the rod pivotally attached to the vehicle seat mounting assembly in a longitudinal position that is closer to the elongated bracket first end than the elongated bracket second end;
a roller attached to a top end of the rod and slidably received in the elongated bracket;
a lowering cable connected at a first end to the rod and at a second end to the seat back; and
an elevating cable connected at a first end to the rod and at a second end to the seat back,
wherein the lowering cable is provided so as to exert a pulling force on the rod causing the rod to pivot such that the roller is moved to the elongated bracket second end, thereby lowering the seat bottom, when the seat back is moved from the rotational position corresponding to the seating mode and ingress/egress mode to the rotational position corresponding to the cargo mode, and
wherein the elevating cable is provided so as to exert a pulling force on the rod causing the rod to pivot such that the roller is moved to the elongated bracket first end, thereby raising the seat bottom, when the seat back is moved from the rotational position corresponding to the cargo mode to the rotational position corresponding to the seating mode and ingress/egress mode.

7. The vehicle seat rotation controlling apparatus according to claim 6, wherein the first end of the lowering cable is connected to a lower portion of the rod disposed below the pivotal attachment of the rod to the vehicle seat mounting assembly and the first end of the raising cable is attached to an upper portion of the rod disposed between the roller and the pivotal attachment of the rod to the vehicle seat mounting assembly.

8. The vehicle seat according to claim 7, wherein the first end of the elongated bracket is disposed relatively rearward of the second end of the elongated bracket.

9. The vehicle seat according to claim 6, wherein the lowering cable and the elevating cable are Bowden cables.

10. The vehicle seat according to claim 6, wherein the vehicle seat rotation controlling apparatus further comprises:
a lowering cable pulley engaging the lowering cable at a position between the first and second end thereof; and
a elevating cable pulley engaging the elevating cable at a position between the first and second ends thereof.

11. The vehicle seat according to claim 10, wherein the lowering cable pulley and the elevating cable pulley are provided in the seat bottom at a rear portion thereof.

12. The vehicle seat according to claim 6, wherein the seat back is rotatably mounted to the seat bottom at a lower portion of the seat back, the seat bottom is rotatably mounted to the vehicle seat mounting assembly at a rear portion of the seat bottom, and the seat bottom height controlling mechanism is provided at a front portion of the seat bottom.

13. The vehicle seat according to claim 6, wherein the vehicle seat rotation controlling apparatus comprises:
a left seat bottom height controlling mechanism, a left lowering cable, and a left elevating cable arranged on a left side of the vehicle seat; and
a right seat bottom height controlling mechanism, a right lowering cable, and a right elevating cable arranged on a right side of the vehicle seat.

14. The vehicle seat according to claim 6, further comprising:
a locking mechanism for locking the vehicle seat in at least one of the seating mode and the cargo mode; and
a lock releasing mechanism that releases the locking mechanism upon actuation.

15. A method of changing a mode of a vehicle seat between a seating mode, an ingress/egress mode, and a cargo mode, the vehicle seat having a seat back and a seat bottom rotatably movable between a seating mode, an ingress/egress mode, and a cargo mode, rotation of the seat back and seat bottom being controlled by a vehicle seat rotation controlling apparatus, comprising: a vehicle seat mounting assembly interconnecting a vehicle floor and the seat bottom such that the vehicle seat is slidably movable in a longitudinal direction; and a seat bottom height controlling mechanism operably connected to the seat back so as to hold the seat bottom in an elevated position while the seat back is in a rotational position corresponding to the seating mode and the ingress/egress mode and to rotate the seat bottom to a lowered position in response to the seat back being rotated to a rotational position corresponding to the cargo mode,
wherein the vehicle seat rotation controlling apparatus comprises: an elongated bracket, having a first end and a second end, attached to the seat bottom; a rod pivotally attached to a portion of the vehicle seat mounting assembly that slidably moves with the seat bottom, the rod pivotally attached to the vehicle seat mounting assembly in a longitudinal position that is closer to the elongated bracket first end than the elongated bracket second end; a roller attached to a top end of the rod and slidably received in the elongated bracket; a lowering cable connected at a first end to the rod and at a second end to the seat back; and an elevating cable connected at a first end to the rod and at a second end to the seat back,
wherein the lowering cable is provided so as to exert a pulling force on the rod causing the rod to pivot such that the roller is moved to the elongated bracket second end, thereby lowering the seat bottom, when the seat back is moved from the rotational position corresponding to the seating mode and ingress/egress mode to the rotational position corresponding to the cargo mode, and wherein the elevating cable is provided so as to exert a pulling force on the rod causing the rod to pivot such that the roller is moved to the elongated bracket first end, thereby raising the seat bottom, when the seat back is moved from the rotational position corresponding to the cargo mode to the rotational position corresponding to the seating mode and ingress/egress mode,
the method comprising the steps of:

from the seating mode, rotating the seat back toward the seat bottom to the rotational position corresponding to the ingress/egress mode which falls within a first predetermined range of rotation over which the pulling force exerted by the lowering cable on the rod is insufficient to cause the rod to pivot, such that the roller remains in the elongated bracket first end and the seat bottom is thereby held in the elevated position, so as to place the vehicle seat in the ingress/egress mode;

from the ingress/egress mode, rotating the seat back further toward the seat bottom to the rotational position corresponding to the cargo mode which is past the first predetermined range of rotation, the rotation of the seat back past the first predetermined range of rotation causing the pulling force exerted by the lowering cable to be sufficient to cause the rod to pivot and move the roller to the elongated bracket second end, thereby rotating the seat bottom into the lowered position, so as to place the vehicle seat in the cargo mode; and from the cargo mode, rotating the seat back away from the seat bottom such that the pulling force exerted on the elevating cable is sufficient to cause the rod to pivot and move the roller to the elongated bracket second end, thereby rotating the seat bottom into the elevated position, so as to place the vehicle seat in the seating mode.

* * * * *